April 18, 1961 W. E. RANEY ET AL 2,980,398
FISH TAPE LEADER
Filed Feb. 13, 1957
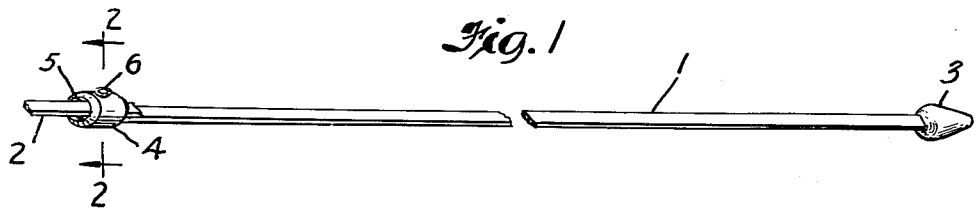
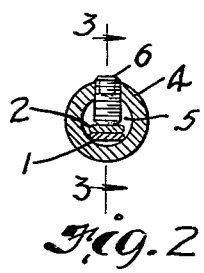 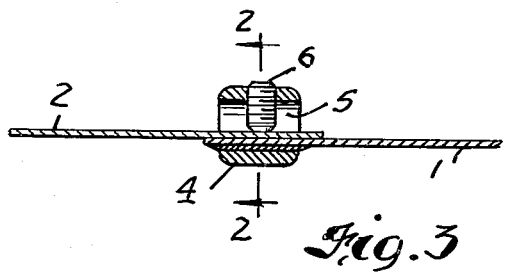
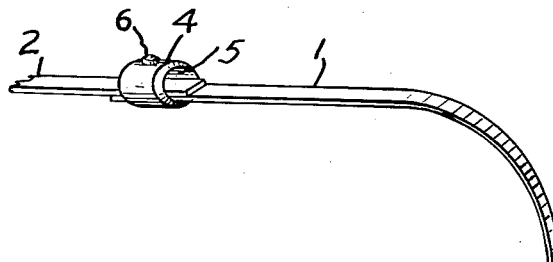
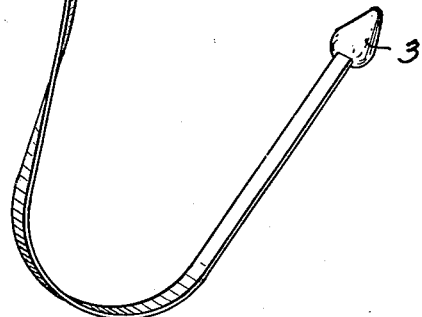
INVENTORS
WILLIAM E. RANEY AND
BY MILAN J. SIEBERT
Oberlin & Limbach
ATTORNEYS.

United States Patent Office 2,980,398
Patented Apr. 18, 1961

2,980,398

FISH TAPE LEADER

William E. Raney, 20080 Frazier Drive, Rocky River, and Milan J. Siebert, 5617 Onaway Oval, Parma, Ohio Filed Feb. 13, 1957, Ser. No. 640,023

1 Claim. (Cl. 254—134.3)

The present invention relates generally, as indicated, to a fish tape leader which is adapted to constitute the terminal end portion of a length of fish tape or what is sometimes referred to as a "snake."

In the pulling of electrical conductors or cables into conduits it is first required to insert through the conduit a length of fish tape whereby the conductors or cable may be secured to the terminal end of the fish tape and then the latter is pulled out of the conduit to thereby draw the conductors or cable into and through the conduit. The feeding of the fish tape under compression into the conduit and then the pulling of the tape in the opposite direction under tension may be done manually or may be accomplished through the use of a power driven fish tape reel such as, for example, is disclosed in the Pat. Nos. 2,556,484 and 2,718,376, granted June 12, 1951, and September 20, 1955, respectively, to William E. Raney.

It is also common practice to mount on the end of the fish tape a so-called fish tape bulb which usually is of generally cylindrical form with rounded ends to guide the fish tape through the conduit and through elbow fittings and curves in the conduit. As an example of a fish tape bulb, reference may be had to the Robert A. Barth Pat. No. 2,727,720, granted December 20, 1955.

Because of the large tensile stresses imposed on the fish tape when it is being used to pull conductors or cable into a conduit the fish tape is usually fabricated from tempered steel and usually is of rectangular cross section for strength and lateral flexibility. A commonly used fish tape is of cross section size approximately $\frac{1}{16}'' \times \frac{1}{4}''$.

However, such tape, $\frac{1}{16}'' \times \frac{1}{4}''$ for example, is relatively stiff over short lengths thereof and therefore it is rather difficult, when longitudinally feeding the tape into a conduit, to commence the curving of the terminal end as when the end of the fish tape encounters a relatively sharp curve in the conduit. Likewise, twisting of the end portion of such tape is difficult to start, as when the tape is fed into a conduit that has successive curves in different planes.

With the foregoing in mind, it is one principal object of this invention to provide a fish tape leader which provides a terminal end portion on a length of fish tape which is of progressively increasing flexibility toward the end to facilitate the starting of the curving and twisting of the fish tape as the tape with such leader is longitudinally fed into conduit having bends or curves.

It is another object of this invention to provide a fish tape leader that is detachable from the fish tape proper so that the leader may be removed when it is desired to draw many electric conductors or a heavy cable into the conduit, or when the conduit has numerous bends, such conditions imposing large tensile loads on the tape.

Other objects and advantages of the present invention will become apparent as the following description proceeds.

To the accomplishment of the foregoing and related ends, the invention, then, comprises the features hereinafter fully described and particularly pointed out in the claim, the following description and the annexed drawing setting forth in detail a certain illustrative embodiment of the invention, this being indicative, however, of but one of the various ways in which the principle of the invention may be employed.

In said annexed drawing:

Fig. 1 is a perspective view of a preferred embodiment of the present fish tape leader, the same being shown secured to the terminal end of a fish tape;

Fig. 2 is a transverse cross section view taken substantially along the line 2—2 of Figs. 1 and 3 through the coupling sleeve at which the fish tape leader and fish tape are secured together;

Fig. 3 is a longitudinal cross section view through the coupling sleeve, such section having been taken along the line 3—3 of Fig. 2; and Fig. 4 is a perspective view showing how the fish tape leader is capable of following curves in the conduit and of twisting as curves in different planes are encountered.

In the specific embodiment of the invention herein disclosed, the fish tape leader 1 for use with, for example, $\frac{1}{16}'' \times \frac{1}{4}''$ fish tape 2, is preferably about 20" long and is made of tempered steel and is rendered of progressively increasing flexibility from one end toward the other by progressively reducing the thickness from about $\frac{1}{16}''$ at one end to about $\frac{1}{32}''$ at the other end, while maintaining the width constant at about $\frac{1}{4}''$. However, it is to be understood that the width of the leader 1 may be progressively decreased instead of the thickness or that both the width and thickness may be decreased from one end toward the other to provide for such increased flexibility at and adjacent the terminal end.

The thin or most flexible end of said fish tape leader 1 has secured thereto, as by brazing, welding or other well-known expedient, a fish tape bulb 3 which is preferably of egg-shape or generally conical shape as shown in Figs. 1 and 4 with a rounded end. By way of example, such bulb 3 may be of $\frac{7}{16}''$ diameter at its large end and about $\frac{5}{8}''$ long.

Welded, brazed or otherwise secured to the thick end of the fish tape leader 1 is a coupling sleeve 4 forming an aperture 5 into which the terminal end portion of the fish tape 2 is adapted to be inserted in longitudinal alignment with said leader 1 and in overlapping relation thereto, said coupling sleeve 4, opposite the juxtapositioned ends of the fish tape 2 and leader 1 being formed with a threaded opening through the wall thereof in which a setscrew 6 is engaged. As apparent, when the setscrew 6 is tightened, the juxtaposed, overlapping end portions of the fish tape 2 and leader 1 are firmly clamped together to resist longitudinal slipping when compressive force is applied on the fish tape 2 and leader 1 as they are fed into a conduit. The outer end of the setscrew 6 may be approximately flush or inset with respect to the outer surface of sleeve 4 so as not to obstruct movement through the conduit.

It can now be seen that as the fish tape 2 with the leader 1 secured thereto is fed into a conduit, the extreme flexibility of the terminal or bulb end of the leader 1 will enable it to readily follow curves in the conduit whereby the curving of the fish tape 2 is greatly facilitated since it is not necessary to attempt to start a bend or curve in a short length of the fish tape 2 as it encounters a curve in the conduit.

Likewise, because of the progressively increasing flexibility of the leader 1 from its tape attached end to its free end, the free end is capable of readily passing through successive curves or elbows that are disposed in angularly related planes by reason of its capability of being readily twisted as required when confronting such successive curves. As evident, when there are U- or S-shaped bends in the conduit no twisting of the leader 1 or tape 2 results when successive bends are in a common plane. However, twisting is encountered when successive curves are in different planes, the most severe condition being encountered when such curves are in planes perpendicular to each other. It can be seen that a 1/16" x 1/4" fish tape (without the leader 1 attached thereto) would be extremely difficult to feed through a conduit that has such curves in different planes owing to the difficulty in starting the twisting over a relatively short length of the fish tape from one curve to the next.

Also, difficulty is encountered (without the present invention) in starting the curving of the end of the fish tape 2 itself as it encounters a short radius curve in the conduit, since it is then attempted to bend or curve a short straight length of the fish tape 2.

It has been found that the present fish tape leader 1 greatly facilitates the longitudinal feeding in of fish tape 2 through a conduit that has curves therein, and especially a conduit that has successive curves lying in angularly related planes. The increased flexibility of the leader 1 toward its free end facilitates the starting of the bending or twisting with substantially less endwise compressive force on the tape 2 than required when the leader 1 is omitted. Having thus started the bend or twist the tape 2 readily follows without excessive compressive load thereon.

Although in the foregoing example reference has been particularly made to a fish tape 1/16" x 1/4", it is to be understood that the principles of the invention may be equally well applied to other sizes of fish tape. Thus, for the most commonly used fish tape which is .060" x 1/8", the fish tape leader may be of 1/8" width and of progressively tapering thickness from about 1/16" to about 1/32" or less. Similarly, such fish tape leader may be of progressively decreasing width in addition to, or in lieu of, the progressively decreasing thickness.

Other modes of applying the principle of the invention may be employed, change being made as regards the details described, provided the features stated in the following claim, or the equivalent of such, be employed.

We therefore particularly point out and distinctly claim as our invention:

A fish tape leader comprising an elongated strip of flexible material of rectangular cross-section, a coupling sleeve at one end of said strip comprising a short length right circular cylindrical tubular member having a circular longitudinal opening therethrough, said one end of said strip being welded therein, and a set screw threaded in said sleeve diametrically opposite said one end of said strip and adapted to clamp a fish tape against said one end of said strip whereby said strip and fish tape are juxtaposed and constitute a substantial linear continuation of each other, said strip being of progressively increasing flexibility from said one end toward the other end to facilitate longitudinal feeding of said leader and of the fish tape adapted to be clamped in said sleeve into a conduit having sharp bends therein, and a generally conically-shaped bulb on said other end of said strip which initially confronts said sharp bends when said leader and such tape are thus longitudinally fed.

References Cited in the file of this patent
UNITED STATES PATENTS

| | | |
|---|---|---|
| 1,593,185 | McCaffrey | July 20, 1926 |
| 1,672,324 | Kepler | Jan. 5, 1928 |
| 1,751,415 | McCaffrey | Mar. 18, 1930 |
| 1,946,037 | Scott | Feb. 6, 1934 |
| 1,978,957 | Pardieck | Oct. 30, 1934 |
| 2,727,720 | Barth | Dec. 20, 1955 |